United States Patent [19]

Allen

[11] 4,378,391
[45] Mar. 29, 1983

[54] ADVERTISING NOVELTY

[76] Inventor: Michael L. Allen, 1104 Chelsea Ave., Rockford, Ill. 61107

[21] Appl. No.: 269,872

[22] Filed: Jun. 3, 1981

[51] Int. Cl.³ .......................... B32B 3/02; B32B 3/12
[52] U.S. Cl. ........................................ 428/14; 40/427; 40/616; 283/56; 428/166; 428/178; 428/192
[58] Field of Search ................. 428/14, 178, 166, 192; 40/455, 559, 427, 616; 156/145; D7/45; D6/274; 283/56, 18; 206/461, 464, 462

[56] References Cited

U.S. PATENT DOCUMENTS 3,494,322 2/1970 Dubbels .............................. 206/462
3,933,245 1/1976 Mullen ............................... 206/461

Primary Examiner—Paul J. Thibodeau
Attorney, Agent, or Firm—Leydig, Voit, Osann, Mayer & Holt, Ltd.

[57] ABSTRACT

Strips of burstable, gas-filled bubbles are adhesively secured to the margins of a substrate (e.g., a paper cocktail napkin) having a printed advertising message and are adapted to be popped by the user to focus the user's attention on the napkin and the message printed thereon.

2 Claims, 5 Drawing Figures

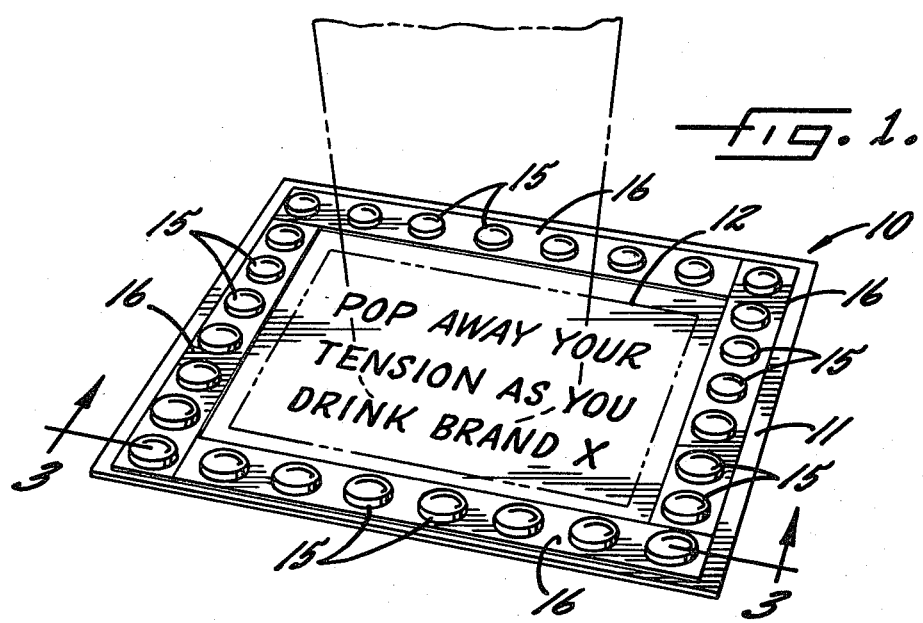
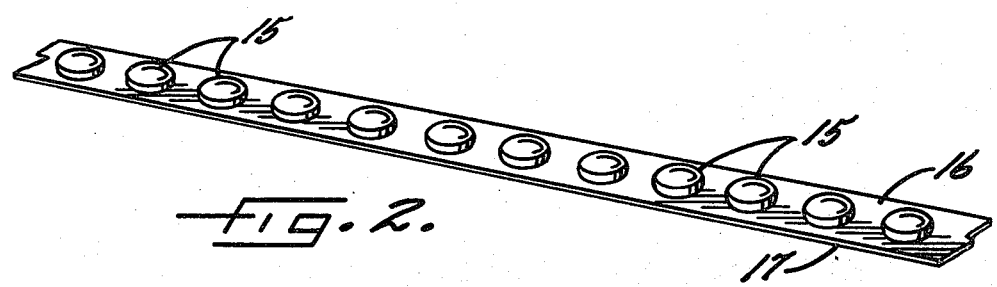
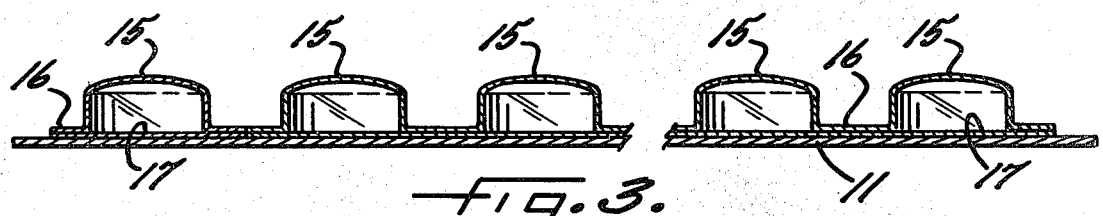
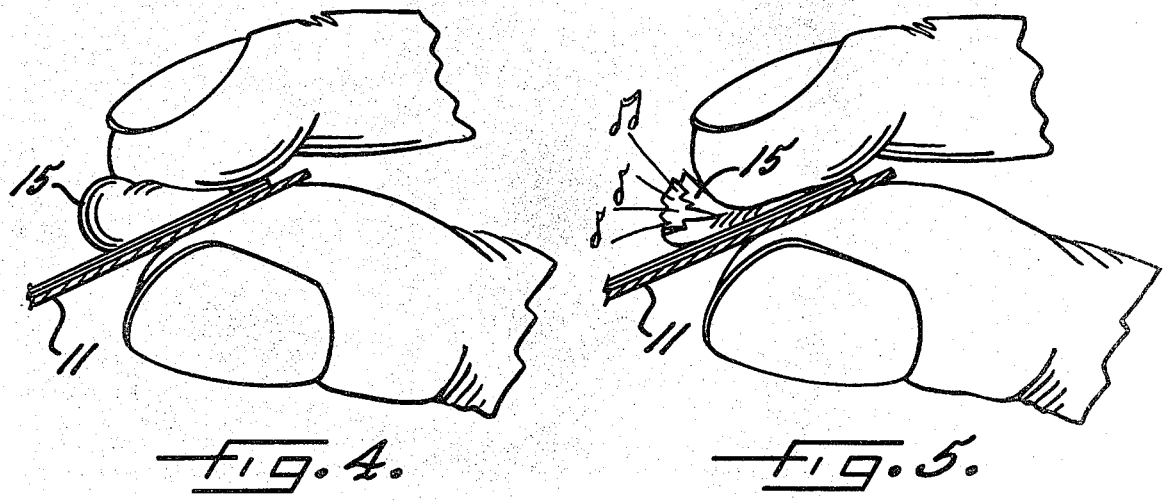

ADVERTISING NOVELTY

BACKGROUND OF THE INVENTION

This invention relates generally to an advertising novelty and more particularly to a novelty having a substrate made of paper or the like and printed with an advertisement or an informative message. The substrate may, for example, be a printed cocktail napkin, a place mat, a card, a flyer or any similar item bearing printed advertising or informative material.

SUMMARY OF THE INVENTION

The general aim of the present invention is to provide a unique advertising novelty in which the substrate carries intriguing means which are adapted to be manipulated by the reader in order to focus attention on the novelty and the message printed thereon.

A more detailed object of the invention is to provide an advertising novelty in which burstable, gas-filled bubbles are attached to the substrate in the vicinity of the printed messages and are adapted to be pinched and popped by the reader, the bubbles thereby drawing the reader's attention to the novelty and to the message carried thereby.

The invention also resides in the novel arrangement of strips of the bubbles on the substrate and around the message and in the use of the bubbles on a substrate such as a cocktail napkin, a place mat or the like.

These and other objects and advantages of the invention will become more apparent from the following detailed description when taken in conjunction with the accompanying drawings.

BRIEF DESCRIPTION OF THE DRAWINGS

FIG. 1 is a perspective view of a new and improved advertising novelty incorporating the unique features of the present invention.

FIG. 2 is a perspective view of one of the strips of bubbles.

FIG. 3 is an enlarged fragmentary cross-section taken substantially along the line 2—2 of FIG. 1.

FIG. 4 is a view showing one of the bubbles being popped.

FIG. 5 is a view showing the bubble of FIG. 4 after the bubble has been popped.

DETAILED DESCRIPTION OF THE PREFERRED EMBODIMENT

The present invention is embodied in an advertising novelty 10 and is particularly characterized by the unique provision of means for causing the prospective reader to physically manipulate the novelty and thereby focus the reader's attention on a printed message carried by the novelty.

In one embodiment of the invention, the novelty 10 is in the form of a cocktail napkin which includes a wafer-like substrate 11 made of paper or other absorbent material. The substrate may be a single layer of paper or paperboard or may be formed by multiple, folded layers. Herein, the substrate 11 of the napkin 10 is square and is printed on one side with a message 12 such as a phrase, a design, a picture or the like. The message preferably is located in the central region of the napkin.

Pursuant to the invention, several burstable, gas-filled bubbles 15 are attached to selected regions on the printed side of the substrate 11 of the napkin 10 and are adapted to be pinched by the thumb and/or fingers of the user. When pinched, the bubbles 15 burst or pop with an audible noise. The presence of the bubbles draws the user's attention to the napkin and causes the user to manipulate the napkin. As a result, the user focuses more sharply on the printed message 12 on the napkin and, in addition, the physical action of bursting the bubbles tends to relax the user and serves as a release for nervous energy.

More specifically, the bubbles 15 preferably are formed as an integral part of a first flexible plastic strip 16 (FIG. 3) which is sealed to and is backed by a second flexible plastic strip 17. The bubbles and the strips may be formed by the well known manufacturing process which is used to make bubble-like packing and cushioning sheets for shipping cartons. It will suffice here to say that each bubble 15 is formed by a hollow, button-like protrusion which projects from one side of the strip 16, the bottom of the bubble being closed by the strip 17. The bubbles are filled with air but otherwise are empty. When the bubbles burst upon being pinched, the escaping air produces a popping noise.

In this instance, the bubbles 15 are spaced from one another in a row along the strip 16. The strip 17 is secured to the printed side of the substrate 11 by any suitable adhesive. Several strips of bubbles preferably extend around the peripheral margins of the substrate and define a border around the message 12.

It will be appreciated that the burstable bubbles 15 may be used in conjunction wih items other than the cocktail napkin 10. The bubbles may, for example, be secured to the upper side of a place mat, may be placed arond the margins of an advertising flyer, may be mounted on a business card or may be used with any other type of item having a substrate with a printed message.

I claim:

1. An advertising novelty comprising a substrate having upper and lower sides, the upper side of said substrate having a substantially flat and planar central portion, printed material on the central portion of the upper side of said substrate and conveying an advertising message, a plurality of plastic strips adhesively secured to the upper side of said substrate and extending along the margins of said substrate to define a border around the central portion of the substrate and around the advertising message, and a plurality of burstable gas-filled bubbles formed integrally with and spaced in a row along each of said strips and adapted to be popped to produce an audible noise when pinched by a thumb or finger, the unpopped bubbles being empty except for the gas therein, and the flat and planar central portion of the upper side of said substrate being free of bubbles.

2. An advertising novelty as defined in claim 1 in which said advertising novelty is a cocktail napkin, said substrate being made from an absorbent, paper-like material, the flat and planar central portion of said substrate defining a rest area for a drinking vessel.

* * * * *